US006626290B2

(12) United States Patent
Byrne et al.

(10) Patent No.: US 6,626,290 B2
(45) Date of Patent: Sep. 30, 2003

(54) STORAGE CONTAINER FOR RECORDED MEDIA

(75) Inventors: James M. Byrne, Massillon, OH (US); Michael S. Jaeb, Millersburg, OH (US); Christopher G. Gallagher, Akron, OH (US)

(73) Assignee: Nexpak Corporation, North Canton, OH (US)

( * ) Notice: Subject to any disclaimer, the term of this patent is extended or adjusted under 35 U.S.C. 154(b) by 0 days.

(21) Appl. No.: 09/907,986

(22) Filed: Jul. 18, 2001

(65) Prior Publication Data

US 2002/0014421 A1 Feb. 7, 2002

Related U.S. Application Data

(60) Provisional application No. 60/219,238, filed on Jul. 18, 2000.

(51) Int. Cl.[7] .............................................. B65D 85/57
(52) U.S. Cl. .............................. 206/308.1; 206/307.1; 206/308.2; 206/310
(58) Field of Search ......................... 206/308.1, 308.2, 206/308.3, 232, 310, 472, 473, 493, 499, 503, 504, 506, 509; 220/4.26, 4.27

(56) References Cited

U.S. PATENT DOCUMENTS

| 4,327,831 A | 5/1982 | Inaba et al. |
| 4,778,047 A | 10/1988 | Lay |
| 4,823,950 A | 4/1989 | Roze |
| 4,844,260 A | 7/1989 | Jaw |
| 4,850,731 A | 7/1989 | Youngs |
| 5,176,250 A | 1/1993 | Cheng |
| 5,188,228 A | 2/1993 | Barrett |
| 5,188,229 A | 2/1993 | Bernstein |
| 5,188,230 A | 2/1993 | O'Brien et al. |
| 5,207,717 A | 5/1993 | Manning |
| 5,246,107 A | 9/1993 | Long et al. |
| 5,284,242 A | 2/1994 | Roth et al. |
| 5,284,918 A | 2/1994 | Huynh-Tran et al. |
| 5,291,990 A | 3/1994 | Sejzer |
| 5,295,577 A | 3/1994 | Minter |
| 5,307,927 A | 5/1994 | Curtis et al. |
| 5,322,162 A | 6/1994 | Melk |
| 5,392,906 A | * 2/1995 | Taniyama ................. 206/308.1 |
| 5,402,882 A | 4/1995 | Bandy et al. |
| 5,407,067 A | 4/1995 | Cotter et al. |
| 5,422,875 A | 6/1995 | Bribach |
| 5,450,953 A | 9/1995 | Reisman |
| 5,460,265 A | 10/1995 | Kiolbasa |
| 5,462,159 A | * 10/1995 | Roth et al. ................. 206/308.1 |
| 5,477,960 A | * 12/1995 | Chen ........................ 206/308.1 |
| 5,506,740 A | 4/1996 | Harmon |
| 5,513,749 A | 5/1996 | Simmons |
| 5,570,781 A | 11/1996 | Bond et al. |
| 5,590,912 A | 1/1997 | Stevens |
| 5,611,426 A | 3/1997 | Warfield |

(List continued on next page.)

FOREIGN PATENT DOCUMENTS

| DE | 296 02 035 U1 | 10/1996 |
| DE | 29700990 U1 | * 7/1997 | ........... B65D/85/57 |

*Primary Examiner*—Mickey Yu
*Assistant Examiner*—J Gregory Pickett
(74) *Attorney, Agent, or Firm*—Sand & Sebolt (57) ABSTRACT

A media storage container includes a hinge wall with base and lid pages hingedly connected to the hinge wall. The base page is adapted to hold a first item of recorded media. A first primary page is connected to the hinge wall. The first primary page is adapted to hold a second item of recorded media. A first secondary page is carried by the first primary page. The first secondary page being adapted to hold a third item of recorded media. The hubs on the primary and secondary pages are offset so that they overlap and help each other to hold discs on the pages.

20 Claims, 10 Drawing Sheets

U.S. PATENT DOCUMENTS

| | | |
|---|---|---|
| 5,651,458 A | 7/1997 | Brosmith et al. |
| 5,657,867 A | 8/1997 | Fu et al. |
| 5,695,054 A * | 12/1997 | Weisburn et al. ........ 206/308.1 |
| 5,697,498 A | 12/1997 | Weisburn et al. |
| 5,713,462 A | 2/1998 | Hansen |
| 5,720,384 A | 2/1998 | Wu-Chen |
| 5,727,681 A | 3/1998 | Li |
| 5,730,283 A | 3/1998 | Lax |
| 5,772,019 A | 6/1998 | Reed |
| 5,775,490 A | 7/1998 | Baker et al. |
| 5,775,491 A | 7/1998 | Taniyama |
| 5,791,468 A | 8/1998 | House |
| 5,799,782 A | 9/1998 | Gelardi |
| 5,806,672 A | 9/1998 | Bosworth |
| 5,813,525 A * | 9/1998 | McQueeny ............... 206/308.1 |
| 5,833,063 A | 11/1998 | Ho |
| 5,865,310 A | 2/1999 | Lee |
| 5,884,761 A | 3/1999 | Gelardi et al. |
| 5,887,713 A | 3/1999 | Smith et al. |
| 5,904,245 A | 5/1999 | Tsujino |
| 5,906,275 A | 5/1999 | Jokic |
| 5,915,549 A | 6/1999 | Palmer et al. |
| 5,975,298 A * | 11/1999 | Sankey et al. ......... 206/387.13 |
| 5,996,785 A | 12/1999 | Palmer et al. |
| 6,050,404 A | 4/2000 | Lee |
| 6,068,117 A | 5/2000 | Koehn |
| 6,073,763 A | 6/2000 | Collins |
| 6,106,015 A | 8/2000 | Udwin et al. |

* cited by examiner

STORAGE CONTAINER FOR RECORDED MEDIA

CROSS REFERENCE TO RELATED APPLICATIONS

This application claims priority from U.S. Provisional Patent Application Ser. No. 60/219,238 filed Jul. 18, 2000; the disclosures of which are incorporated herein by reference.

BACKGROUND OF THE INVENTION

1. Technical Field

The present invention generally relates to storage containers for recorded media and, more particularly, a storage container system having components that allow the system to be selectively configured to hold different numbers of items of recorded media. Specifically, the present invention relates to a storage container for disc-shaped items of recorded media that includes pages that may be selectively snapped to a hinge structure to configure the container to hold different quantities of items.

2. Background Information

Movie and music collections are becoming increasingly popular in today's marketplace. Such a collection typically includes multiple items of recorded media packaged together along with printed literature. The manufacturers of these collections desire storage containers that can hold all of the items of recorded media and literature together in a single package.

Such collections are being released on DVD, CD, VHS tapes, and cassette tapes. The art desires a container that can be selectively configured to hold different numbers of these items of recorded media depending on the content of the collection. The art also desires that the containers maintain a standard height and width so that the containers will fit in existing storage and display containers.

SUMMARY OF THE INVENTION

The present invention provides a media storage container that includes a secondary page that is carried by a primary page with both pages being adapted to hold an item of recorded media. The container also includes a lid page and a base page with the base page being adapted to hold an item of recorded media.

The invention also provides a storage container having pages with opposed offset hubs that cooperate together to hold discs in the container.

The invention further provides a storage container that has multiple pages that each have their own perimeter sidewalls wherein the sidewalls of all the pages cooperate together to form the common sidewall of the container when the pages are closed.

The invention further provides a storage container wherein the pages of the container are connected to a hinge wall having hinges disposed on both sides of each page.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

Similar numbers refer to similar parts throughout the specification.

DESCRIPTION OF THE PREFERRED EMBODIMENTS

The storage container of the present invention is indicated generally by the numeral 10 in the accompanying drawings. In the first embodiment of storage container 10, container 10 includes a base page 12, a first primary page 14, a second primary page 16, and a lid page 18. Base page 12, primary pages 14 and 16, and lid page 18 are held together by a hinge wall 20. In the embodiment of the invention having two primary pages 14 and 16, hinge wall 20 includes a first back wall 22 and a second back wall 24. Base page 12 is connected to first back wall 22 by a first living hinge 26. Lid page 18 is connected to second back wall 24 by a second living hinge 28. First back wall 22 is connected to second back wall 24 by a third living hinge 30. Walls 22 and 24 and hinges 26, 28, and 30 allow container 10 to be open in a variety of configurations so that pages 12, 14, and 16 may be easily accessed by the user of container 10.

Figure 9:
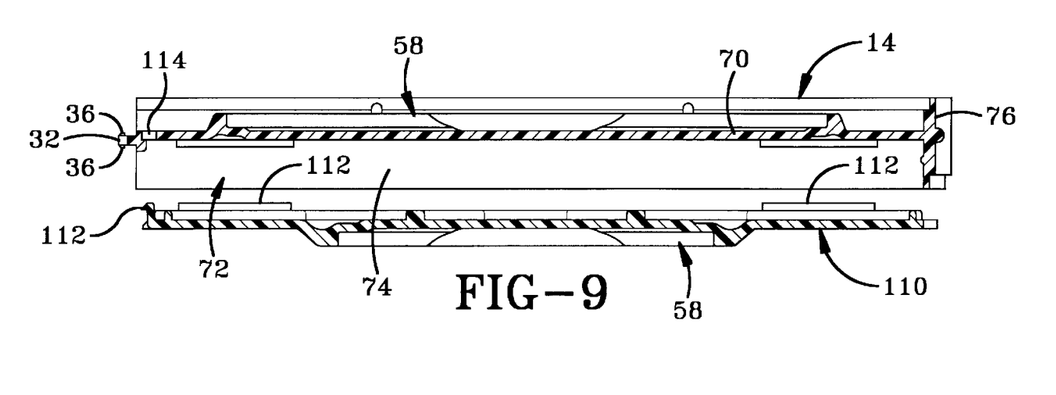
FIG. 9 is a sectional view taken along line D—D of FIG. 8 and showing a secondary page exploded from the primary page.
Figure 10:
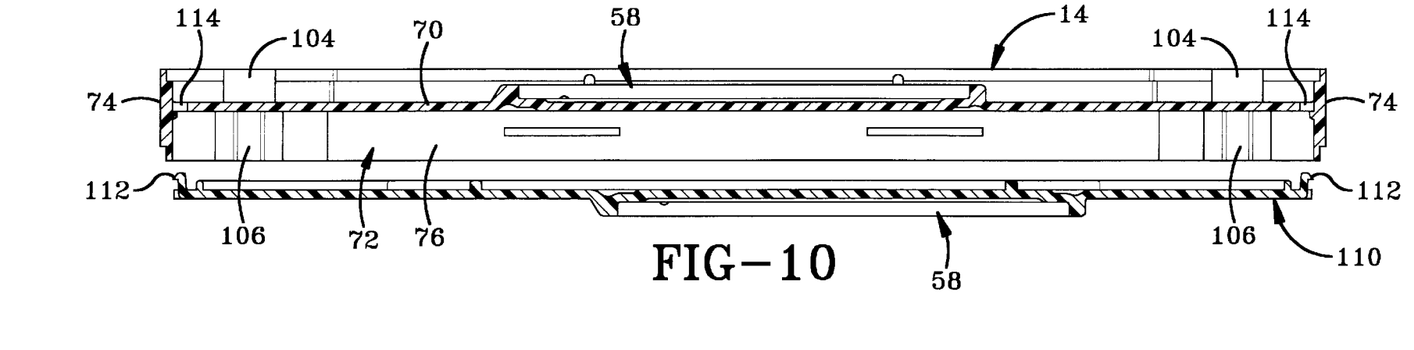
FIG. 10 is a sectional view taken along line E—E of FIG. 8 showing the primary page in section with a secondary page exploded from the primary page.

In accordance with the objectives of the present invention, each primary page 14 and 16 may be selectively snapped into either back wall 22 or 24 to add storage capacity to container 10. Each primary page 14 and 16 includes a pair of tabs 32 and a guide protuberance 34. In other embodiments of the invention, guide protuberance 34 may also be a snap tab or may be removed. Each snap tab 32 includes a pair of oppositely extending latches 36 (FIG. 9) that are configured to snap into tab slots 38 formed in back walls 22 and 24. Back walls 22 and 24 also define a guide slot configured to slidingly receive guide protuberance 34.

Figure 1:
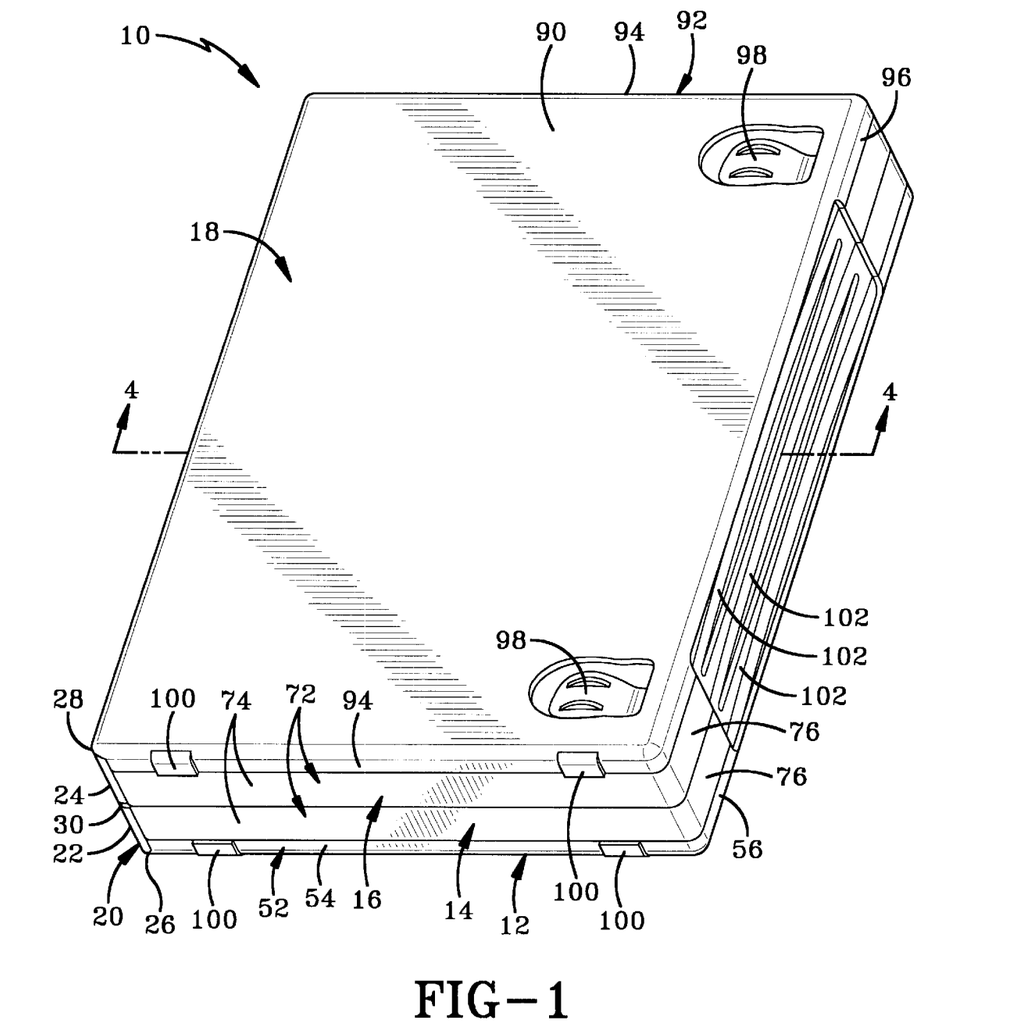
FIG. 1 is a perspective view of the storage container of the present invention wherein the storage container is configured to hold up to five items of recorded media.
Figure 2:
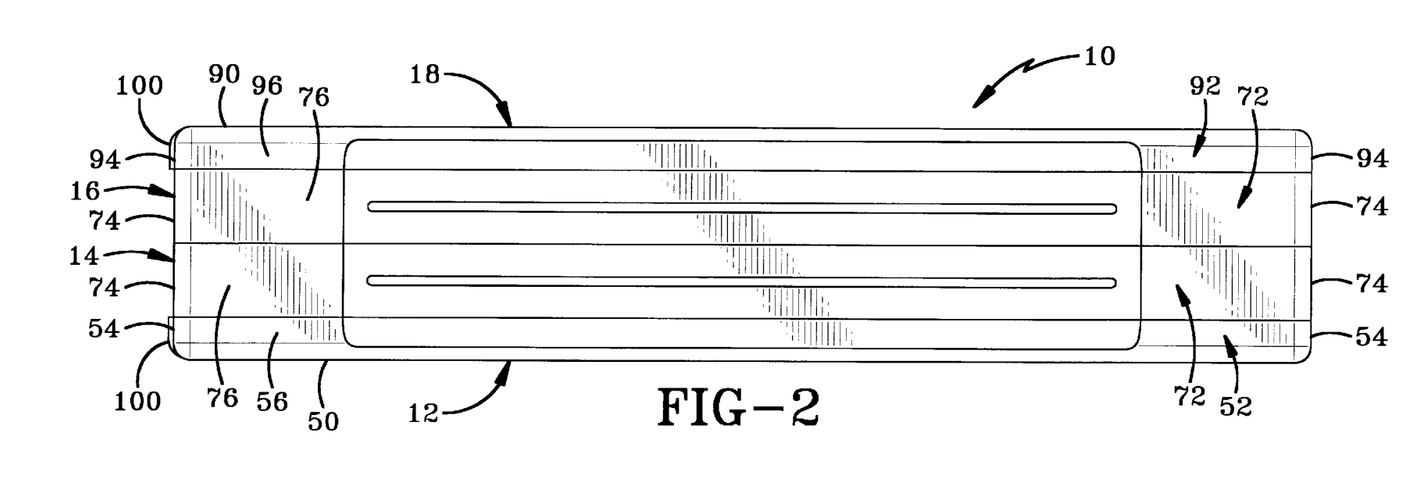
FIG. 2 is a front elevational view of FIG. 1.
Figure 3:
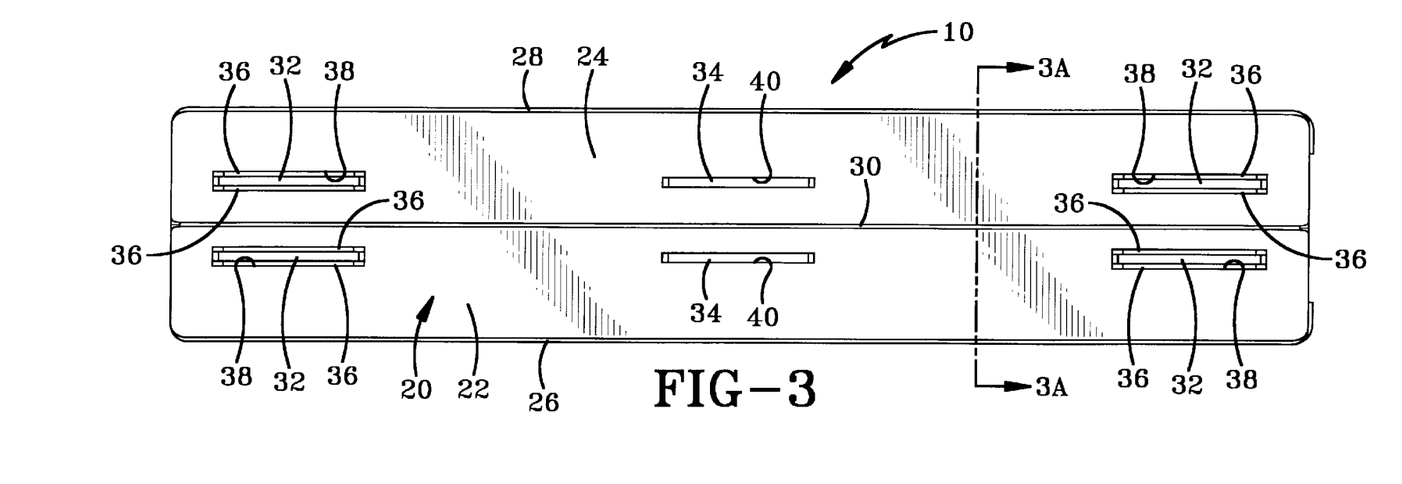
FIG. 3 is a rear elevational view of FIG. 1.
Figure 3A:
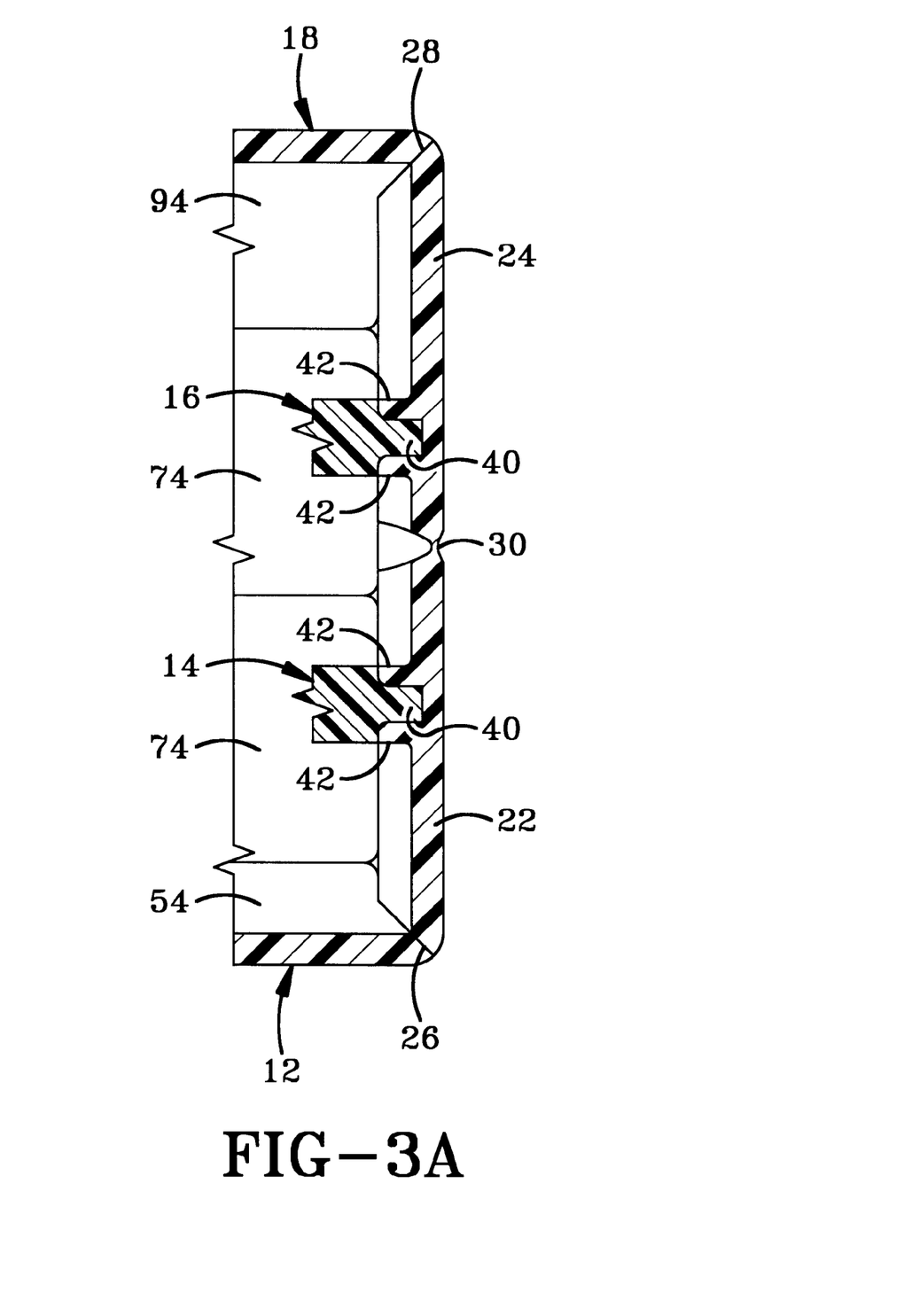
FIG. 3A is a sectional view taken along line 3A—3A of FIG. 3.

Each back wall 22 and 24 may include a longitudinal channel formed by a pair of substantially parallel guide walls 42 that are disposed on either side of tab slots 38 and guide slots 40. Guide slots 40 and guide walls 42 may be seen in FIG. 3A. Guide walls 42 and guide slots 40 provide extra rigidity to back walls 22 and 24 and help guide the insertion of pages 14 or 16 into walls 22 or 24.

Base 12 generally includes a bottom wall 50 with a perimeter wall 52 extending around bottom wall 50 from hinge wall 20 to hinge wall 20. Perimeter wall 50 generally includes a pair of opposed sidewalls 54 and a front wall 56. The walls of base 12 are preferably integrally formed. A media holding arrangement is preferably integrally formed in bottom wall 50. In the embodiment of the invention depicted in the drawings, media holding arrangement 58 is in the form of a disc hub and surrounding wall having a finger access hole. This type of disc holding arrangement may be better understood by reviewing the disclosures of U.S. Pat. No. 5,996,788. In general, the disc snaps over the center portion or hub 60 of holding arrangement 58 with the outer wall 62 of holding arrangement 58 protecting the outer edge of the disc. Holding arrangements of this type are useful for holding CDs and DVDs. Other holding arrangements 58 may be used to hold computer game cartridges, cassette tapes, video cassettes, computer discs, and the like.

Figure 4:
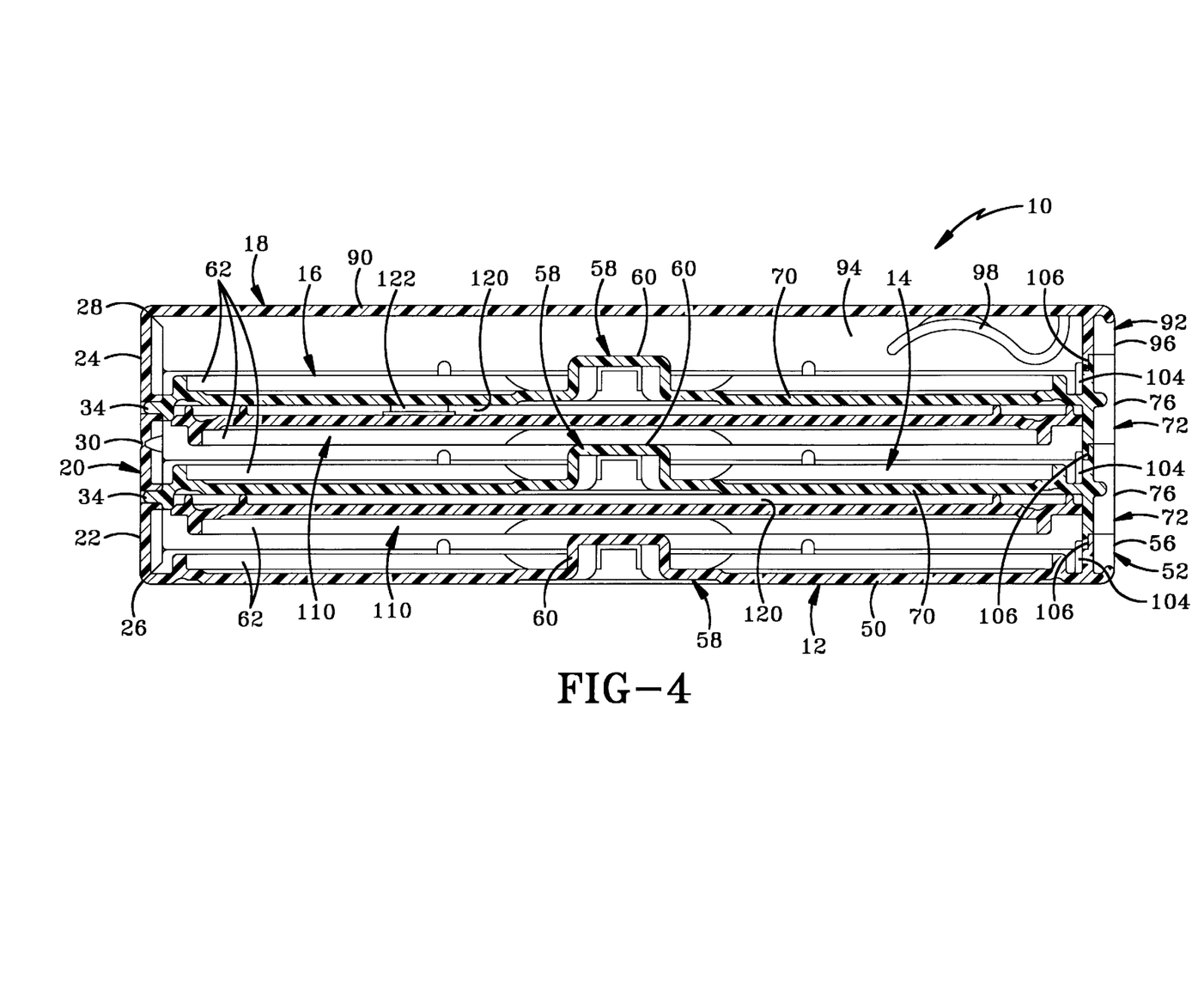
FIG. 4 is a sectional view taken along line 4—4 of FIG. 1.
Figure 5:
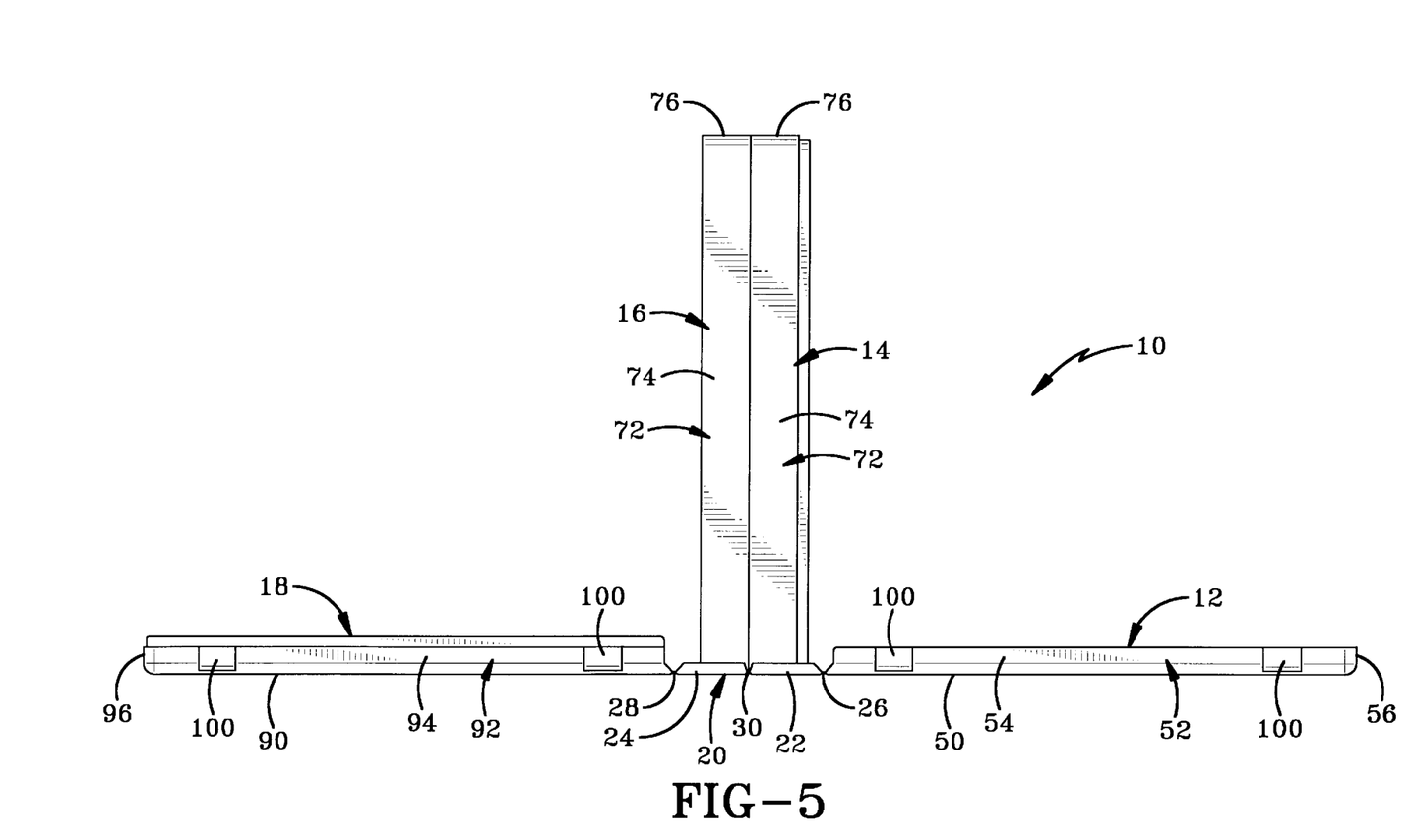
FIG. 5 is a side elevational view of the storage container of FIG. 1 in a partially opened configuration.
Figure 6:
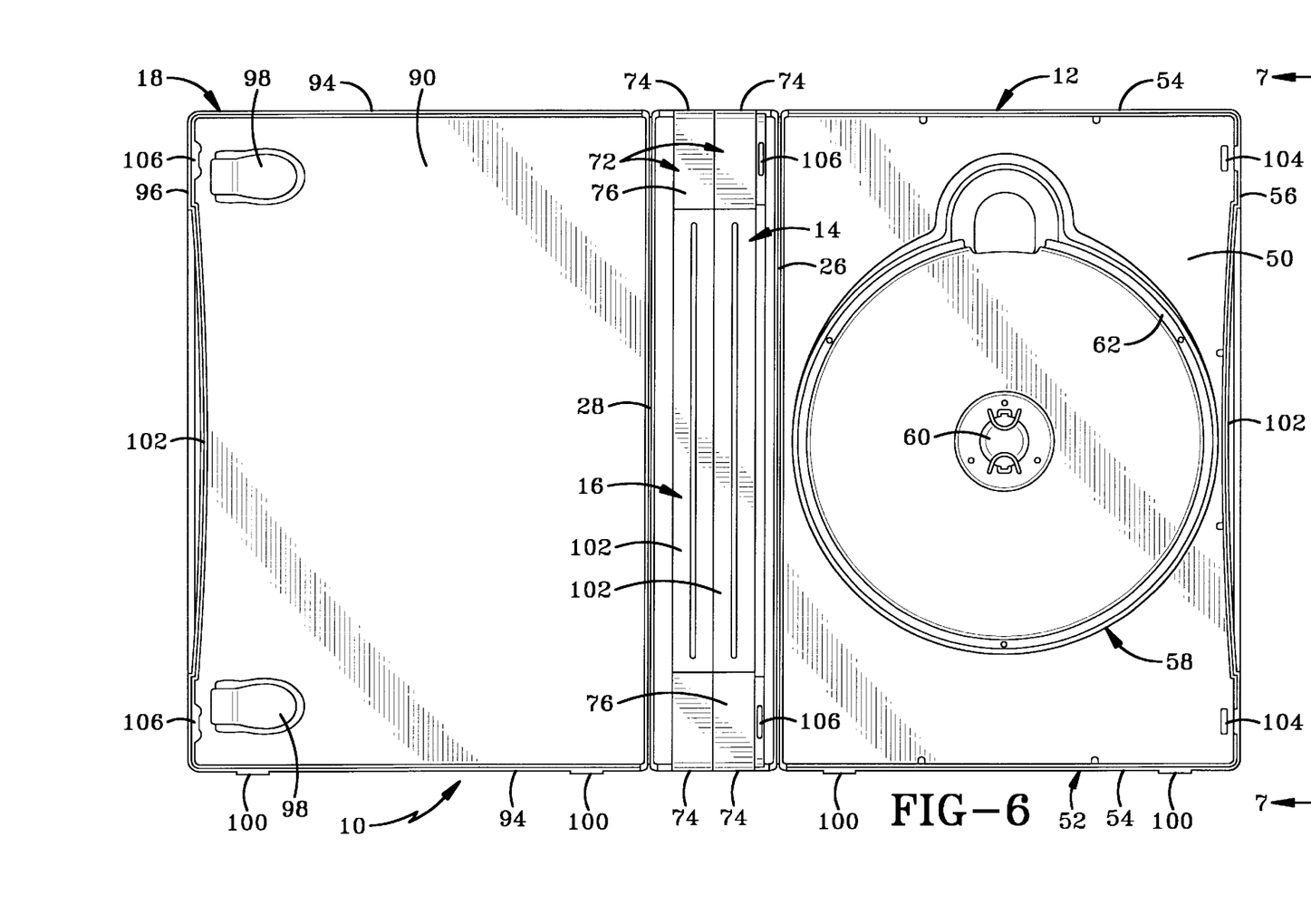
FIG. 6 is a top plan view of FIG. 5.
Figure 7:
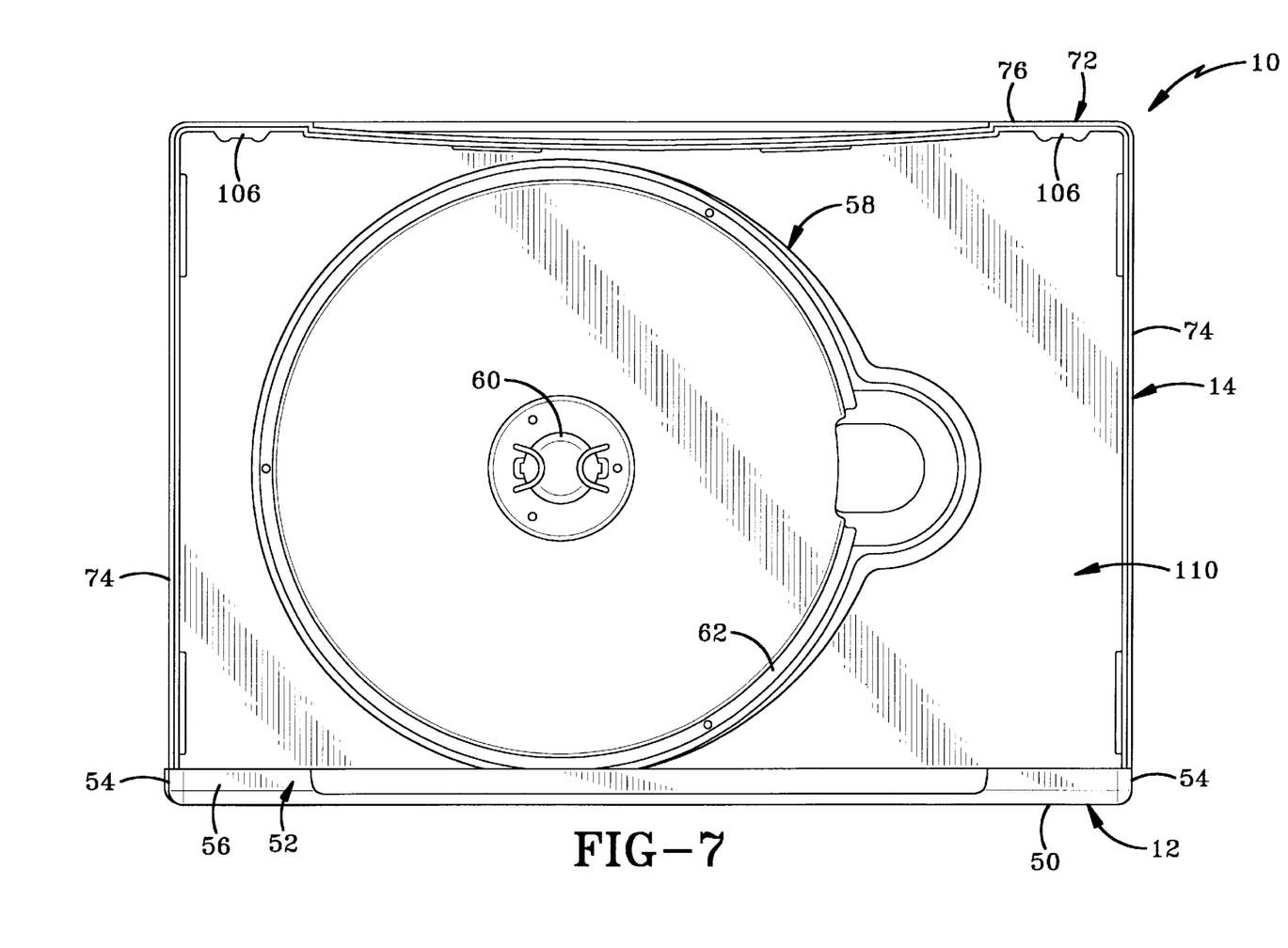
FIG. 7 is a view taken along line 7—7 of FIG. 6.
Figure 8:
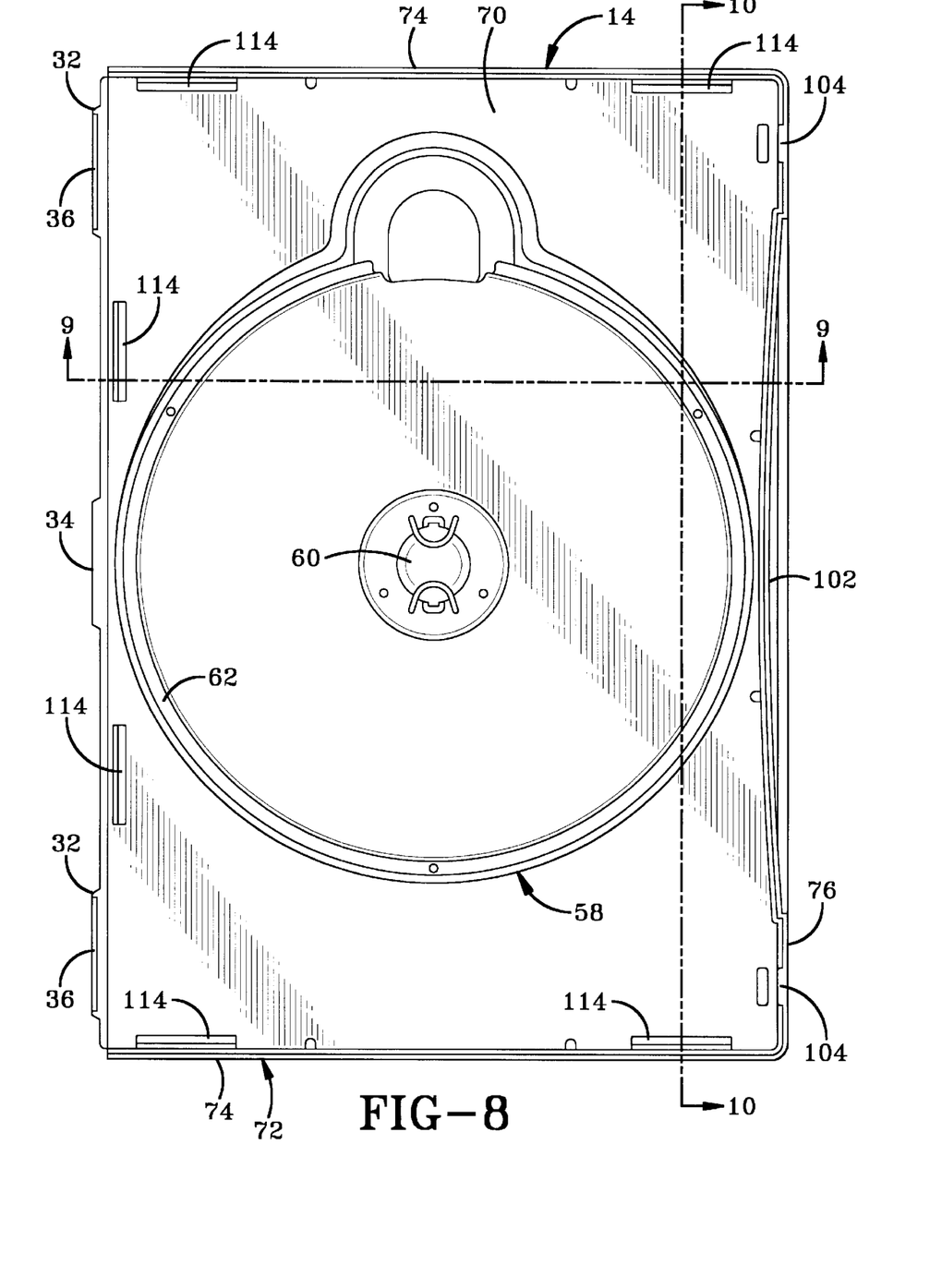
FIG. 8 is a top plan view of one of the primary pages of the storage container.
Figure 11:
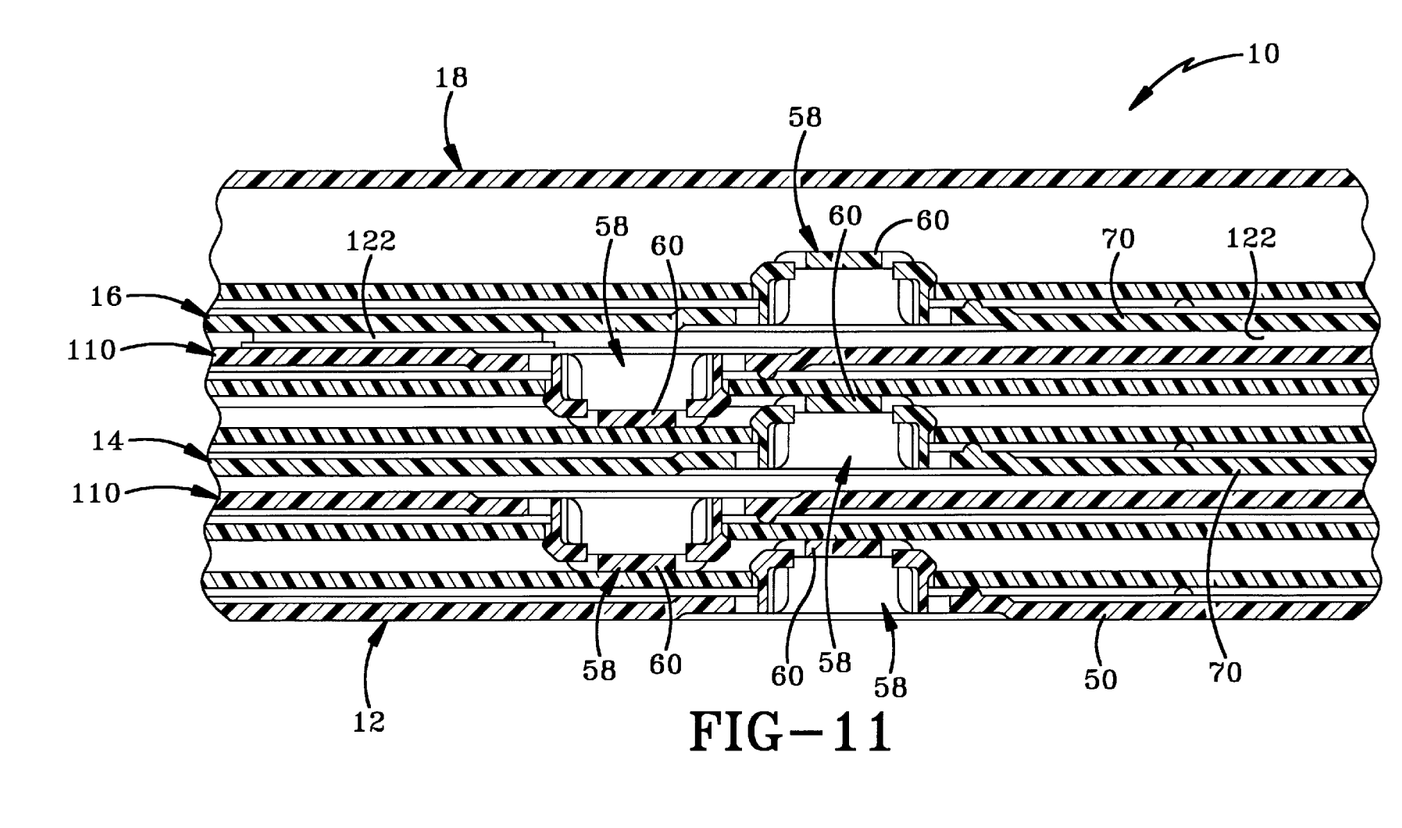
FIG. 11 is a sectional view taken through the hubs of the storage container.

Primary pages 14 and 16 each include a base wall 70 and a perimeter wall 72 surrounding three sides of base wall 70. Perimeter wall 72 includes a pair of opposed sidewalls 74 and a front wall 76. Each base wall 70 includes a media holding arrangement 58 as described above. The position of media holding arrangements 58 on primary pages 14 and 16 are preferably the same with respect to hinge wall 20 so that media holding arrangements 58 are aligned when viewed from the top or bottom view as shown in FIG. 4. This alignment is also shown in FIG. 11.

Lid page 18 includes a base wall 90 and a perimeter wall 92 that extends about three sides of base wall 90. Perimeter wall 92 includes a pair of opposed sidewalls 94 and a front wall 96 that are preferably integrally formed with base wall 90. Lid page 18 includes literature holding clips 98.

The lower sidewall 54 and 94 of base page 12 and lid page 18 include spaced apart feet 100 that help support container 10 when placed on end.

Frontwalls 56, 76, and 96 include cooperating concaved depressions 102 that form a common concave depression in the front wall of container 10.

The upper surface of base page 12 and each primary page 14 and 16 includes a first half of a latch 104 while the lower portion of each primary page 14 and 16 as well as lid page 18 includes a second half of a latch 106. Latch halves 104 and 106 cooperate to hold the pages together when they are closed with respect to each other. The position of latch halves 104 and 106 are consistent so that the pages may be interchanged and still latched together.

In accordance with another objective of the present invention, container 10 includes secondary pages 110 that snap into the backs of primary pages 14 and 16. Each secondary page 110 includes a media holding arrangement 58 that may be the same as hub 60 and wall 62 described above or may be a different media holding arrangement known in the art. In the preferred embodiment of the invention depicted in the drawings, media holding arrangement 58 is offset on secondary pages 110 compared to media holding arrangements 58 on primary pages so that hubs 60 are not directly opposed when a secondary page is facing a primary page. The offset is depicted in FIG. 11. The position of holding arrangements 58 on secondary pages 110 allows the overall thickness of container 10 to be decreased and allows opposed hubs 60 to help each other hold discs on the hubs. In FIG. 11, the upper walls of opposed hubs 60 actually touch the opposed discs.

Each secondary page 110 includes at least one but preferably a plurality of retaining hooks 112 that snap into retaining slots 114 defined in primary page 14 or 16. In the preferred embodiment, hooks 112 are formed at the edge of secondary pages 110 and openings 114 are formed along the edge of base wall 70. Hooks 112 are configured to securely snap fit with the primary page so that secondary page 110 cannot easily be removed from primary page after it is installed.

When secondary page is installed on a primary page, a chamber 120 is defined between the pages. This chamber may be used to house an EAS tag 122 as depicted in FIG. 4. This position is desirable because it is not easily accessible by a consumer and the consumer does not know if an EAS tag 122 is present in container 10 or not.

The elements and structures described above allow the user to configure storage container 10 to hold three items of recorded media by simply using base 12 and first and second primary pages 14 and 16. If a fourth item of recorded item is required, a first secondary page 110 is snapped into one of primary pages 14 and 16. If a fifth item of recorded media is desired, a second secondary page 110 is snapped into the other primary page 14 or 16.

If the user only wants to use the container 10 to hold two items of recorded media, the user inserts a single primary page 14 into a base page 12 and lid page 18 combination having a hinge wall 20 with a single back wall 22 with a single set of tab slots 38. In this embodiment, hinge 30 is not present and only living hinges 26 and 28 are used.

The system described above allows the manufacturer to manufacture component parts and selectively configure them to hold different numbers of items of recorded media as desired by the retail market. The overall device is compact and maintains the same width and height dimensions as a standard single storage container for an item of recorded media. Only the thickness of the container changes as items of recorded media are added.

Accordingly, the improved storage container for recorded media apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the storage container for recorded media is constructed and used, the characteristics of the construction, and the advantageous new and useful results obtained; the new and useful structures, devices, elements, arrangements, parts, and combinations are set forth in the appended claims.

What is claimed is:

1. A storage container for holding an item of recorded media; the media storage container comprising:
   a hinge wall;
   a base page having a media holding arrangement formed thereon to hold a first item of recorded media;
   the base page being hingedly connected to the hinge wall and moveable relative to the hinge wall between open and closed positions;
   a lid page hingedly connected to the hinge wall and moveable relative to the hinge wall between open and closed positions;
   a first primary page connected to the hinge wall;
   the first primary page having a hub formed thereon to hold a second item of recorded media; and a first secondary page carried by the first primary page; the first secondary page having a hub formed thereon to hold a third item of recorded media; the hub of the first secondary page being offset from the hub of the first primary page.

2. The storage container of claim 1, wherein the base page is connected to the hinge wall with a living hinge.

3. The storage container of claim 2, wherein the lid page is connected to the hinge wall with a living hinge.

4. The storage container of claim 1, further comprising a second primary page connected to the hinge wall;
the second primary page being adapted to hold a fourth item of recorded media;
the hinge wall including first and second back walls connected together with a hinge;
the first primary page being connected to the first back wall;
the second primary page being connected to the second back wall;
the base page being connected to the first back wall; and
the lid page being connected to the second back wall.

5. The storage container of claim 4, further comprising a second secondary page carried by the second primary page; the second secondary page being adapted to hold a fifth item of recorded media.

6. The storage container of claim 5, wherein the second secondary page is snap fit to the second primary page.

7. The storage container of claim 1, wherein the first secondary page is snap fit to the first primary page.

8. The storage container of claim 7, wherein the first secondary page includes a retaining hook; the first primary page defining an opening; and the retaining hook of the first secondary page snap fitting into the opening defined by the first primary page.

9. The storage container of claim 1, wherein an EAS tag storage chamber is defined between the first primary page and the first secondary page.

10. The storage container of claim 9, further comprising an EAS tag disposed in the EAS tag storage chamber.

11. The storage container of claim 1, further comprising a foot on the base page and a foot on the lid page; the feet being spaced from one another and cooperating to provide a support to the storage container.

12. The storage container of claim 1, wherein the first primary page includes a bottom wall and a continuous perimeter wall.

13. The storage container of claim 1, wherein:
the base page includes a base wall and a perimeter wall having an edge along its length, said perimeter wall projecting from and surrounding the base wall on all sides not connected to the hinge wall;
the lid page includes a base wall and a perimeter wall having an edge along its length, said perimeter wall projecting from and surrounding the base wall of the lid page on all sides not connected to the hinge wall;
the first primary page includes a base wall and a perimeter wall having a pair of edges along its length, said perimeter wall projecting from and surrounding the base wall of the first primary page on all sides not connected to the hinge wall; and
the perimeter walls of the base page, lid page, and first primary page abut along their respective edges to form a common perimeter wall when the base page, lid page, and first primary page are closed.

14. The storage container of claim 13, wherein each perimeter wall includes a front wall defining a portion of a concave opening; the portions of the concave opening being aligned to form a common concave opening when the base page, lid page, and first primary page are closed.

15. A storage container for holding an item of recorded media; the media storage container comprising:
a substantially flat hinge wall defining at least one slot;
a base page having a media holding arrangement formed thereon to hold a first item of recorded media;
the base page being hingedly connected to the hinge wall and moveable relative to the hinge wall between open and closed positions;
a lid page hingedly connected to the hinge wall and moveable relative to the hinge wall between open and closed positions;
a first primary page connected to the hinge wall;
the first primary page having a base wall and including at least one tab which snap fits into the at least one slot, the tab extending outwardly from the base wall and toward the flat hinge wall when the first primary page is aligned to connect to the hinge wall;
the first primary page having a media holding arrangement formed thereon to hold a second item of recorded media; and
a first secondary page carried by the first primary page; the first secondary page having a media holding arrangement formed thereon to hold a third item of recorded media.

16. A storage container for holding an item of recorded media; the media storage container comprising:
a substantially flat hinge wall defining at least one slot;
a base page having a media holding arrangement formed thereon to hold a first item of recorded media;
the base page being hingedly connected to the hinge wall and moveable relative to the hinge wall between open and closed positions;
a lid page hingedly connected to the hinge wall and moveable relative to the hinge wall between open and closed positions;
a first primary page connected to the hinge wall;
the first primary page having a base wall and including at least one tab which snap fits into the at least one slot, the tab extending outwardly from the base wall and toward the flat hinge wall when the first primary page is aligned to connect to the hinge wall;
the hinge wall having a length, the at least one slot being elongated along the length of the hinge wall and the at least one tab being elongated complementary to the at least one slot;
the first primary page having a media holding arrangement formed thereon to hold a second item of recorded media; and
a first secondary page carried by the first primary page; the first secondary page having a media holding arrangement formed thereon to hold a third item of recorded media.

17. A storage container for holding an item of recorded media; the media storage container comprising:
a substantially flat hinge wall defining at least one slot;
a base page having a media holding arrangement formed thereon to hold a first item of recorded media;
the base page being hingedly connected to the hinge wall and moveable relative to the hinge wall between open and closed positions;

a lid page hingedly connected to the hinge wall and moveable relative to the hinge wall between open and closed positions;

a first primary page connected to the hinge wall;

the first primary page having a base wall and including at least one tab which snap fits into the at least one slot, the tab extending outwardly from the base wall and toward the flat hinge wall when the first primary page is aligned to connect to the hinge wall;

the hinge wall having a length, the at least one slot being elongated along the length of the hinge wall and the at least one tab being elongated complementary to the at least one slot;

the at least one slot being bounded by elongated edges and the tab including oppositely extending latches which engage the hinge wall along the elongated edges;

the first primary page having a media holding arrangement formed thereon to hold a second item of recorded media; and a first secondary page carried by the first primary page; the first secondary page having a media holding arrangement formed thereon to hold a third item of recorded media.

18. A storage container for holding an item of recorded media: the media storage container comprising:

a substantially flat hinge wall defining at least one slot;

a base page having a media holding arrangement formed thereon to hold a first item of recorded media;

the base page being hingedly connected to the hinge wall and moveable relative to the hinge wall between open and closed positions;

a lid page hingedly connected to the hinge wall and moveable relative to the hinge wall between open and closed positions;

a first primary page connected to the hinge wall;

the first primary page having a base wall and including at least one tab which snap fits into the at least one slot, the tab extending outwardly from the base wall and toward the flat hinge wall when the first primary page is aligned to connect to the hinge wall;

the hinge wall having a length, the at least one slot being elongated along the length of the hinge wall and the at least one tab being elongated complementary to the at least one slot;

the substantially flat hinge wall defining a guide slot and the first primary page including a guide protuberance extending outwardly from the base wall thereof; the guide protuberance being disposed in the guide slot;

the first primary cage having a media holding arrangement formed thereon to hold a second item of recorded media; and a first secondary page carried by the first primary page; the first secondary page having a media holding arrangement formed thereon to hold a third item of recorded media.

19. A storage container for holding an item of recorded media; the media storage container comprising:

a substantially flat hinge wall defining at least one slot;

a base page having a media holding arrangement formed thereon to hold a first item of recorded media; the base page being hingedly connected to the hinge wall and moveable relative to the hinge wall between open and closed positions;

a lid page hingedly connected to the hinge wall and moveable relative to the hinge wall between open and closed positions;

a first primary page connected to the hinge wall;

the first primary page having a base wall and including at least one tab which snap fits into the at least one slot, the tab extending outwardly from the base wall and toward the flat hinge wall when the first primary page is aligned to connect to the hinge wall;

the hinge wall having a length, the at least one slot being elongated along the length of the hinge wall and the at least one tab being elongated complementary to the at least one slot;

guide walls being disposed on the hinge wall on either side of the at least one slot;

the first primary page having a media holding arrangement formed thereon to hold a second item of recorded media; and a first secondary page carried by the first primary page; the first secondary page having a media holding arrangement formed thereon to hold a third item of recorded media.

20. A storage container for holding an item of recorded media; the media storage container comprising:

a hinge wall;

a base page having a hub formed thereon to hold a first item of recorded media;

the base cage being hingedly connected to the hinge wall and moveable relative to the hinge wall between open and closed positions;

a lid page hingedly connected to the hinge wall and moveable relative to the hinge wall between open and closed positions;

a first primary page connected to the hinge wall;

the first primary page having a media holding arrangement formed thereon to hold a second item of recorded media;

a first secondary page carried by the first primary page; the first secondary page including a hub formed thereon to hold a third item of recorded media; the hub of the first secondary page being offset from the hub of the base page; and the hubs having a height that allows the hubs to cooperate to hold items of recorded media on the hubs when the first primary page is closed.

* * * * *